(12) United States Patent
Comas et al.

(10) Patent No.: US 11,009,408 B2
(45) Date of Patent: May 18, 2021

(54) TEMPERATURE MEASUREMENT CALIBRATION IN AN ADDITIVE MANUFACTURING SYSTEM

(71) Applicant: HEWLETT-PACKARD DEVELOPMENT COMPANY, L.P., Houston, TX (US)

(72) Inventors: Esteve Comas, Sant Cugat del Valles (ES); Sergio De Santiago Dominguez, Sant Cugat del Valles (ES); Marina Ferran Farres, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 208 days.

(21) Appl. No.: 16/097,256

(22) PCT Filed: Jul. 26, 2016

(86) PCT No.: PCT/US2016/043968
§ 371 (c)(1),
(2) Date: Oct. 27, 2018

(87) PCT Pub. No.: WO2018/022001
PCT Pub. Date: Feb. 1, 2018

(65) Prior Publication Data
US 2019/0113398 A1 Apr. 18, 2019

(51) Int. Cl.
*G01K 15/00* (2006.01)
*G01J 5/00* (2006.01)
(Continued)

(52) U.S. Cl.
CPC .......... *G01K 15/005* (2013.01); *B29C 64/264* (2017.08); *B29C 64/393* (2017.08);
(Continued)

(58) Field of Classification Search
USPC ............................ 374/1, 121, 163, 124, 141
See application file for complete search history.

(56) References Cited

U.S. PATENT DOCUMENTS

| | | |
|---|---|---|
| 5,602,389 A | 2/1997 | Kato et al. |
| 6,293,696 B1 | 9/2001 | Guardado |
| (Continued) | | |

FOREIGN PATENT DOCUMENTS

| | | |
|---|---|---|
| CN | 105216311 A | 1/2016 |
| CN | 105619802 A | 6/2016 |
| (Continued) | | |

OTHER PUBLICATIONS

Corbin, David et al., Temp Calibration of Additive Manufacturing Process-Monitoring Thermal Imaging System, Materials Science & Tech Meeting Abstract (2015).
(Continued)

*Primary Examiner* — Mirellys Jagan
(74) *Attorney, Agent, or Firm* — HP Inc. Patent Department (57) ABSTRACT

Examples of temperature measurement calibration in an additive manufacturing system are described. In one case, a method of calibrating a non-contact temperature measurement device involves applying energy from a radiation source of the additive manufacturing system to heat a reference element. The reference element is thermally coupled to a temperature sensor. A temperature reading from the temperature sensor is compared with data from the non-contact temperature measurement device to calibrate the device.

14 Claims, 4 Drawing Sheets

(51) Int. Cl.
*G01K 1/00* (2006.01)
*G01K 7/00* (2006.01)
*B33Y 30/00* (2015.01)
*B29C 64/393* (2017.01)
*B29C 64/264* (2017.01)
*B33Y 50/00* (2015.01)
*G01J 5/08* (2006.01)
*G01J 5/60* (2006.01)
*B33Y 10/00* (2015.01)
*B33Y 40/00* (2020.01)
*B33Y 50/02* (2015.01)

(52) U.S. Cl.
CPC .............. *B33Y 30/00* (2014.12); *B33Y 50/00* (2014.12); *G01J 5/0037* (2013.01); *G01J 5/0896* (2013.01); *G01J 5/605* (2013.01); *G01K 15/00* (2013.01); *B33Y 10/00* (2014.12); *B33Y 40/00* (2014.12); *B33Y 50/02* (2014.12); *G01J 2005/0048* (2013.01); *G01J 2005/0085* (2013.01)

(56) References Cited

U.S. PATENT DOCUMENTS

| | | | | |
|---|---|---|---|---|
| 6,930,278 | B1* | 8/2005 | Chung | B23K 26/32 219/121.85 |
| 2005/0276308 | A1 | 12/2005 | Pint | |
| 2015/0100149 | A1 | 4/2015 | Coeck et al. | |
| 2015/0268099 | A1* | 9/2015 | Craig | G01J 5/0003 374/130 |
| 2017/0266762 | A1* | 9/2017 | Dave | B41M 5/262 |
| 2017/0297095 | A1* | 10/2017 | Zalameda | B29C 64/393 |
| 2019/0126607 | A1* | 5/2019 | De Pena | B29C 41/46 |
| 2019/0134709 | A1* | 5/2019 | Dave | B22F 3/1055 |
| 2020/0156312 | A1* | 5/2020 | Chen | B29C 64/153 |
| 2020/0298496 | A1* | 9/2020 | Puigardeu Aramendia | B29C 64/393 |

FOREIGN PATENT DOCUMENTS

| | | |
|---|---|---|
| DE | 10243411 A1 | 4/2004 |
| DE | 10346993 A1 | 6/2005 |
| FR | 2914417 A1 | 10/2008 |

OTHER PUBLICATIONS

International Search Report and Written Opinion for International Application No. PCT/US2016/043968, dated Apr. 6, 2017, 16 pages.
Rodriguez, Emmanuel et al., Integration of a Thermal Imaging Feedback Control System in Electron Beam Melting, SFF Symposium Proceedings Manuscript, p. 945-61, Sep. 15, 2012.
Ranieri, S. et al. "Data processing technique applied to the calibration of a high performance FPA infrared camera" Infrared Physics & Technology 43 (2002) 345-351.
Dinwiddie, R. "Calibrating IR Cameras for In-Situ Temperature Measurement During the Electron Beam Melt Processing of Inconel 718 and TI-A16-V4" Proc. of SPIE vol. 9861 (2016).
Everton, Sarah K. et al "Review of in-situ process monitoring and in-situ metrology for metal additive manufacturing" Materials and Design 95, 2016, pp. 431-445.
Marshall, G. et al. "Understanding the Microstructure Formation of Ti-6AI-4V During Direct Laser Deposition via In-Situ Thermal Monitoring" JOM (2016) vol. 68 Issue 3, 14 pages.

* cited by examiner

TEMPERATURE MEASUREMENT CALIBRATION IN AN ADDITIVE MANUFACTURING SYSTEM

BACKGROUND

Additive manufacturing systems, including those commonly referred to as "3D printers" build three-dimensional (3D) objects from selective addition of build material. In an example system, build material is formed in layers, in a working area. Chemical agents, referred to as "printing agents", are then selectively deposited onto each layer within the working area. In one case, the printing agents may comprise a fusing agent and a detailing agent. In this case, the fusing agent is selectively applied to a layer in areas where particles of the build material are to fuse together, and the detailing agent is selectively applied where the fusing action is to, be reduced or amplified. For example, a detailing agent may be applied to reduce fusing at an object boundary to produce a part with sharp and smooth edges. Following the application of printing agents, energy is applied to the layer. This fuses particles of build material. The process is then repeated for another layer, such that objects are built from a series of cross-sections.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

In certain additive manufacturing systems, measurement of working area temperatures enables feedback control of build material heating. For example, radiation sources may be controlled to selectively apply energy to layers of build material, in certain cases following deposit of printing agents, based on temperature measurements, e.g. a level of radiation may be adjusted or at least one radiation source may be selectively switched on and off. If the temperature of portions of a working area, e.g. where layers of build material are formed, varies from desired operational ranges this can lead, for example, to poor cohesion between layers and structurally unsound builds. For example, portions of an upper layer of build material wherein a fusing agent has been applied may need to be heated to above a melting point to cause the build material to melt, coalesce or fuse, and then solidify after cooling. In this case, inaccurate measurement of temperature may lead to incomplete fusion (if the temperature is too low) or may cause unwanted chemical changes (if the temperature is too high).

In additive manufacturing systems with temperature measurement systems, it has been found that temperature measurement errors can lead to measured working area temperatures that vary from a desired range. For example, these temperatures may be measured in relation to an upper layer of build material following application of printing agents and energy from radiation sources. In certain cases, these measurement errors may be reduced with suitable equipment calibration, e.g. calibration of thermal cameras and/or other temperature sensors. However, the accuracy of this calibration may directly impact build quality, by leading to temperature variations and the associated issues described above. It has also been found that temperature measurement calibration can drift during manufacturing, which can result in build quality decreasing over the course of the build.

For example, a number of factors may result in temperature measurement errors, including, amongst others: temperature reading drift due to heating of the additive manufacturing system, e.g. during use; dust accumulation on a lens or filter of a thermal camera; vapor condensation on a lens or filter of a thermal camera; damage to a lens or filter of a thermal camera due to contact with a build material; damage to a lens or filter of a thermal camera due to cleaning following contact with a build material; electrical noise affecting read values and/or transmission of those values; and, overheating of a thermal camera and/or its component parts such as a filter or lens.

Certain examples described herein reduce temperature (i.e. thermal) measurement calibration issues in additive manufacturing systems. For example, they may reduce issues with poor build quality and low reliability by providing improved thermal measurement accuracy. Certain examples thus reduce build issues by providing an improved calibration approach. In this approach, energy is applied to a reference element and a temperature reading is obtained from the reference element. This temperature reading can be used to calibrate a thermal camera. Regular calibration of a thermal camera improves the manufacture quality from build to build. In this case, temperature information is obtained by a plurality of devices and then compared to calibrate at least one of the devices. In one example, the temperature information is obtained by a non-contact temperature measurement device and a temperature sensor. As such temperature measurement calibration can occur prior to, and/or during, a build (i.e. prior to and/or during additive manufacturing).

In certain examples described herein, thermal measurements are calibrated by comparing at least one temperature reading, measured from a reference element, e.g. using a temperature sensor, when the reference element is positioned at a number of different positions. The temperature reading is compared with an output of a thermal camera to calibrate the camera. The reference element may have a known emissivity, such that heating of the element follows a known profile. This then allows controlled heating of the reference element to a desired temperature based on a predetermined radiation source energy level and heating time.

Certain approaches described herein provide benefits over comparative methods that calibrate temperature measurements by heating build material (e.g. polymer powder)

through the melting point of the material. These comparative methods look for a clear transition from solid to liquid for a build material and subsequently analyze a cooling phase until a crystallization point to characterize a measured transition curve. This measured transition curve may then be compared to a reference transition curve for the build material, e.g. from a dataset or the like, to calibrate a thermal camera or other temperature sensor. To ensure accuracy, these methods use a homogeneous sample of build material with an established reference curve. In contrast, certain examples described herein, do not melt build material to calibrate temperature measurement systems. As such they may be used to calibrate measurement devices in additive manufacturing systems that use amorphous build materials that do not have clear transition slopes. Furthermore, as they may operate without melting and recrystallizing a build material, certain examples as described herein reduce build material use.

In certain cases, the additive manufacturing system may be configured to calibrate temperature measurements by comparing a temperature reading from a temperature sensor with data from a thermal camera. This may be achieved by applying energy from a radiation source of the additive manufacturing system to heat a reference element. The reference element may be thermally coupled to a temperature sensor. The temperature reading and data from the thermal camera are then compared, e.g. if the difference in measurements may be used to adjust future readings of data from the thermal camera. In certain cases, an adjustment may be made when the difference in measurements is greater than a predefined threshold, e.g. 1 degree Celsius. In certain cases, the reference element may be moved relative to the thermal camera. Certain examples described herein also enable a calibration factor for the thermal camera. Further examples described herein enable a pixel-specific calibration factor for the thermal camera. This improves the quality of temperature measurement calibration and therefore improves build quality by ensuring the accuracy of a measured temperature of the working area (and in turn an upper layer of build material).

Figure 1:
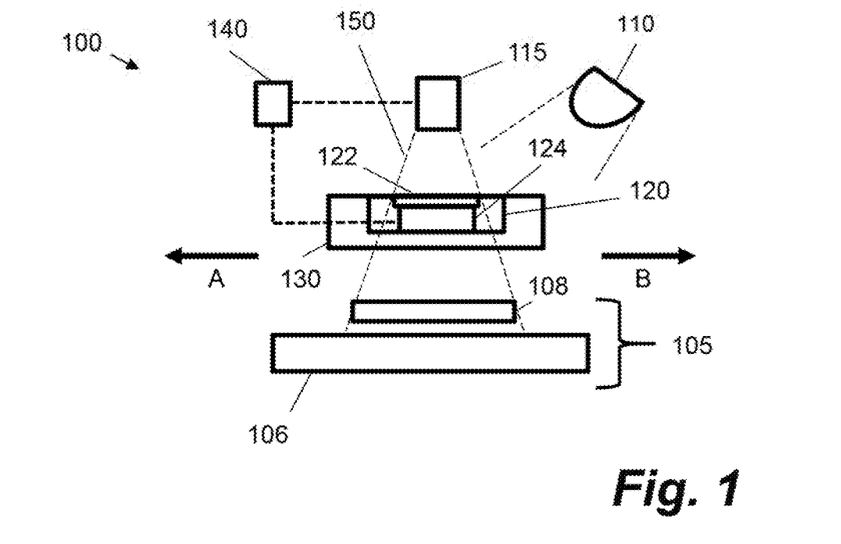
FIG. 1 is a schematic diagram showing build components of an additive manufacturing system according to an example.

FIG. 1 shows an additive manufacturing system 100 according to an example. The additive manufacturing system 100 of FIG. 1 is configured to deposit layers of build material within a working area 105. The build material may comprise a polymer powder. A fusing agent may be applied to a layer of build material to fuse defined areas of the layer following the application of fusing energy, e.g. from a fusing lamp. Similarly, in certain cases, a detailing agent may be applied to areas of a layer of build material, for example to inhibit, or modify a degree of fusing. A three-dimensional object undergoing additive manufacture may thus be built layer-by-layer within the working area 105. In certain cases, at least one agent may be deposited onto a layer of build material that is formed within the working area 105 via a printhead deposit mechanism, such as a thermal or piezo printhead. In FIG. 1, the working area 105 is shown comprising a platen or base 106 and a layer of build material 108. The layer of build material 108 may be present during manufacture (e.g. as a series of layers are built upwards) but may not be present prior to manufacture. These features demonstrate a context for an example temperature calibration adaptation as described below.

The additive manufacturing system 100 of FIG. 1 comprises a radiation source 110 to apply energy to heat the working area 105, a non-contact temperature measurement device 115 to provide a temperature profile of the working area 105 and at least one thermal calibration unit 120. In certain cases, the system may also have a mounting 130, which may be static or moveable, that positions the at least one thermal calibration unit 120 relative to the non-contact temperature measurement device 115. The at least one thermal calibration unit 120 comprises a calibration surface 122. The calibration surface 122 may have a known emissivity. The calibration surface 122 is in thermal communication with a temperature sensor 124. The additive manufacturing system 100 of FIG. 1 also comprises a controller 140. The controller 140 in FIG. 1 is communicatively coupled to the non-contact temperature measurement device 115 and the temperature sensor 124. The controller 140 is configured to determine a correction profile for the temperature measurement device based on a comparison of the temperature profile and data from the temperature sensor. For example, the controller 140 may be configured to determine a difference between the temperature profile and data from the temperature sensor. In one case, an average temperature value from the temperature profile may be used. The difference may be used to adjust at least one value in the temperature profile. For example, if the data from the temperature sensor indicates a temperature of 149.5° C. but the temperature profile indicates an average temperature of 148.3° C., the controller 140 may adjust future values from non-contact temperature measurement device 115 by 1.2° C.

In certain, examples, the mounting 130 may be arranged to effect relative movement between the non-contact temperature measurement device 115 and the at least one thermal calibration unit 120. This relative movement may comprise movement of at least one of the non-contact temperature measurement device 115, the thermal calibration unit 120 and the mounting 130 itself. In certain examples, the controller 140 is arranged to compare a temperature reading obtained from the temperature sensor 124 with different data readings from the non-contact temperature measurement device 115 to calibrate said device. For example, each relative movement may enable a different group of pixels associated with thermal camera data to be calibrated. The temperature reading may be obtained at different positions which may comprise different relative positions of the at least one thermal calibration unit 120 and the non-contact temperature measurement device 115.

In the example of FIG. 1, the calibration surface 122 is heated by the radiation source 110. In certain cases, the calibration surface 122 may be moved relative to the non-contact temperature measurement device 115, e.g. in directions A and/or B as shown in the figure. In cases where the at least one thermal calibration unit 120 is statically mounted to the mounting 130, the mounting 130 may be moved in directions A and/or B. In these certain cases, the non-contact temperature measurement device 115 may obtain a temperature profile of an area that includes the calibration surface 122, e.g. in FIG. 1 the calibration surface 122 is moved underneath the non-contact temperature measurement device 115. In this case, the calibration surface 122 is within a field of view 150 of the non-contact temperature measurement device 115 when the at least one thermal calibration unit 120 is moved underneath the non-contact temperature measurement device 115. During relative movement of the calibration surface 122 within the field of view 150, different measurements may be read by the controller 140 from the temperature sensor 124. For example, a scan of the at least one thermal calibration unit 120 under the field of view 150 may be performed. This enables different portions of the non-contact temperature measurement sensor to be calibrated, e.g. different arrays of thermal imaging sensors. This may be continuous or in discrete steps. The temperature reading obtained at different positions may then be compared by the controller 140 with temperature measurements from the field of view 150, e.g. different columns of data in a heat map, to produce a calibration factor for the non-contact temperature measurement device 115. In one case, the mounting 130 may be moved into and out of the field of view 150 to enable at least one temperature comparison to be made.

In certain examples, the radiation source 110 may comprise a lamp, for example a short-wave incandescent lamp. In other examples, the radiation source 110 may be another light source constructed to emit electro-magnetic radiation across a range of wavelengths to heat the working area 105 and the calibration surface 122. For example, the radiation source 110 may be a halogen lamp. In certain cases, the additive manufacturing system 100 may comprise additional radiation sources to heat the either the working area 105 or the calibration surface 122 or both. In certain cases, radiation sources may have other uses, for example the radiation sources may comprise lighting systems to illuminate the working area and/or to fuse a build material. The radiation source 110 used to heat the reference element may comprise an infra-red "pre-heat" lamp that is used during additive manufacturing to heat an upper layer of build material to a temperature just below melting point. In certain cases, one or more radiations sources 120 may be moveable relative to the working area 105. For example, in one implementation a fusing lamp may be carriage-mounted so as to scan across build material that is formed within the working area 105. If a fusing lamp is mounted on a carriage that scans above a print carriage then the fusing lamp may be used to heat the reference element.

In certain cases, the non-contact temperature measurement device 115 may comprise a thermal camera. In another case, the non-contact temperature measurement device 115 may comprise an infra-red sensor. In one case, a one or two dimensional array of infra-red sensors may implement the non-contact temperature measurement device 115.

In one example, the non-contact temperature measurement device 115 may be configured to obtain a two-dimensional heat map. The two-dimensional heat map may, for example, comprise a two-dimensional representation of working area temperature or reference element temperature. This may be the case when the non-contact temperature measurement device 115 comprises a thermal imaging camera. In certain cases, a thermal imaging camera may comprise a plurality of infra-red sensors. In one example, a thermal imaging camera may comprise an array of thermopiles and an optical system. The optical system may comprise a system of lenses such that an infra-red image is formed by the camera. In such an example, each thermopile may return a value representative of radiation integrated within its spectral window.

In certain examples, the mounting 130 forms part of an agent deposit mechanism to deposit printing agents upon build material formed with working area 105, e.g. during manufacture of a three-dimensional object. For example, if the agent deposit mechanism comprises an inkjet delivery system, the mounting 130 may be statically coupled to, or form part of, a print carriage comprising inkjet print heads. In this case, the print carriage may be moved relative to the working area 105. The mounting 130 may effect movement over the working area in the directions A and B as indicated. Movement may occur along one or two axes. In one case, the working area 105 and the non-contact temperature measurement device 115 are respectively statically arranged below and above the mounting 130. In this case, the mounting 130 may be moved relative to the non-contact temperature measurement device 115 by moving a print carriage along at least one print movement axis, e.g. by moving the print carriage backwards and forwards as is performed during manufacture of an object. In other cases, the mounting 130 may form part of a scanning fusing lamp carriage, wherein the carriage scans in a similar manner across a working area underneath a "pre-heat" lamp.

In an example, the calibration surface 122 has a length extending in a direction perpendicular to a direction of relative movement. In the example of FIG. 1, this may comprise a length along an axis, that is perpendicular to (i.e. into) the figure. In this case, the additive manufacturing system 100 may be constructed such that the length of the calibration surface 122 is aligned with one dimension of the field of view 150 of the non-contact temperature measurement device 115.

In the example of FIG. 1, the calibration surface 122 is arranged on an opposite side of the mounting 130 to the working area 105. This reduces the probability of signal-reducing particles, for example dust from the working area 105, obscuring the path from the non-contact temperature measurement device 115 to the calibration surface 122. This assists the non-contact temperature measurement device 115 in producing accurate temperature readings of the calibration surface 122 that may be compared with at least one measured temperature from the temperature sensor 124. The temperature sensor 124 may comprise a PT 1000 body temperature sensor probe. The temperature sensor 124 may provide a continuous reading of temperature from the calibration surface 122 during the printing process (i.e. manufacture). If the at least one thermal calibration unit 120 is mounted upon a print carriage of the additive manufacturing system, then calibration may be performed as the print carriage is moved so as to deposit at least one agent onto build material formed into a layer within working area 105. For example, at points during this movement temperature readings from temperature sensor 124 may be compared to the data obtained by the non-contact temperature measurement device 115 at the controller 140.

A calibration surface 122 integrated within a print carriage means that use of a separate commercial black body emitter may be avoided. In one case, similar to the shown arrangement of FIG. 1, a calibration surface 122 may be arranged on the top of a print carriage. In this case, easy access to the top of the print carriage improves the ease with which the calibration surface 122 may be cleaned. In another example, the calibration surface 122 may be mounted on a fusing lamps assembly supported by the print carriage 120.

In the described examples, the calibration surface 122 may have a known emissivity. This enables the controller 140 to heat the calibration surface for a predetermined amount of time, with a predetermined energy level, such to reach a desired temperature for calibration. This desired temperature may be a melting point for the build material. In other cases, the calibration factor can be calculated without the emissivity. In certain cases, the calibration surface 122 is selected to have a high diffusivity and be scratch-resistant. In one case, the calibration surface 122 comprises black anodized aluminum. The calibration surface 122 may be a surface of an elongate block of aluminum. The calibration surface 122 may be provided with a coating, which may be resistant to dust, to improve cleaning. Coatings may additionally or alternatively be scratch-resistant. Coatings may include Kapton and/or Teflon, e.g. in the form of applied tapes.

The relative orientations of the components of the additive manufacturing system 100 shown in FIG. 1 are illustrative and so may have different relative orientations in situ. For example, the radiation source 110 and the non-contact temperature measurement device 115 may face substantially the same direction or substantially in different directions. In certain cases, the radiation source 110 faces squarely onto the calibration surface 122 to aid even heating of the thermal calibration unit 120. In an additive manufacturing system 100 having a plurality of radiation sources 110 even heating of the calibration surface 122 may be achieved with a number radiation sources 110 which are angled with respect to calibration surface 122. In certain cases, the non-contact temperature measurement device 115 may be statically-mounted above a plane containing the calibration surface 122 such that it faces the calibration surface 122 to produce accurate temperature readings.

Figure 2:
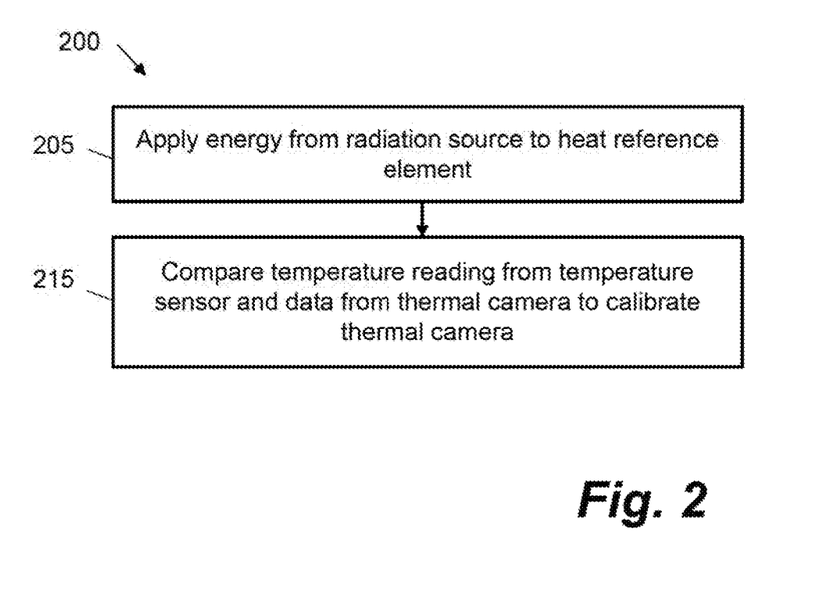
FIG. 2 is a flowchart showing a method of temperature measurement calibration for additive manufacturing according to an example.

FIG. 2 is a flowchart showing a method 200 of temperature measurement calibration for additive manufacturing according to an example. This method may be applied upon the additive manufacturing system 100 of FIG. 1 or upon a different system.

At block 205, energy is applied from a radiation source to heat a reference element. The reference element may comprise the calibration surface 122 as described with reference to FIG. 1. In an example the reference element is thermally coupled to a temperature sensor.

At block 215, a temperature reading obtained from the temperature sensor is compared with data from the non-contact temperature measurement device to calibrate said device. In certain cases, the comparison at block 215 comprises determining a difference between a temperature reading from the temperature sensor and data from the non-contact temperature measurement device. This difference may be used to adjust (i.e. to calibrate) future readings from the non-contact temperature measurement device (e.g. readings during additive manufacturing).

In one example, comparing a temperature reading comprises obtaining a two-dimensional heat map from a thermal camera, the two-dimensional heat map covering a field of view of the thermal camera. In this case, an average of pixel measurements may be used (e.g. an average of one column of pixel measurements or an average of a cluster of pixel measurements that differ by less than a predefined threshold). In one case, the method may comprise obtaining a temperature measurement from the temperature sensor at each of a plurality of positions during a relative movement of the reference element. This may be performed on a continuous basis during the relative movement or when the reference element is static following a discrete movement during the relative movement. In this case, the set of temperature measurements from the reference element may be compared to the two dimensional heat map and any difference in values therein may be used to calibrate the thermal camera. For example, each position of the reference element during the relative movement may enable a different column (or row) of pixel measurements within the two-dimensional heat map to be calibrated.

The data from the thermal camera may for example comprise a two-dimensional representation of reference element temperature as a function of position, for example expressed as a temperature T at associated Cartesian x-y coordinates. This two-dimensional representation may comprise an array or an 'image' or 'heat map' of the reference element (e.g. when reference element is within a field of view such as 150), wherein values within the array or 'image' are representative of the temperature as measured by the non-contact temperature measurement device. In other examples, the data from the thermal camera may comprise a relative measurement, e.g. a difference in temperature between two areas and/or a difference between a measured temperature and a desired minimum temperature.

In certain cases, the reference element is arranged on a print carriage, the print carriage comprising at least one printhead to deposit printing agents during manufacture of a three-dimensional object. In this example, the reference element may be moved relative to the non-contact temperature measurement device. In an example, moving the reference element relative to the non-contact temperature measurement device comprises moving the print carriage within the field of view of the non-contact temperature measurement device. As described with reference to the example of FIG. 1, the non-contact temperature measurement device may be statically mounted above such a print carriage.

A calibration factor may be determined from the temperature reading obtained by the temperature sensor and the data obtained by the non-contact temperature measurement device to calibrate temperature measurement. For example, by comparing an average value of the pixels within a two dimensional heat map with a temperature measurement, a calibration factor for a thermal imaging camera may be provided. A pixel-specific calibration factor may be provided by comparing each column or row of pixels within a two dimensional heat map with a temperature measurement. The calibration factor may apply across the whole field of thermal pixels. When applied, the calibration factor may lead to an increase in the temperature reading of one pixel and lead to a decrease in the temperature reading of another pixel in the thermal camera. In this way temperature measurement calibration which is accurate on a pixel scale may be achieved.

In certain cases, the blocks shown in method 200 of FIG. 2 may be repeated for different energy levels of the radiation source to calibrate the thermal camera across a range of temperature levels. This ensures that the camera may be calibrated, and remain calibrated, for example during a build using many materials during which the energy levels of the radiation source may change.

In certain cases, the blocks shown in method 200 of FIG. 2 may be performed prior to manufacture of a three-dimensional object. In this case, a mounting (e.g. a print carriage) may be moved underneath a radiation source at a given energy level to heat the reference element. In one case, a comparison of one reading from the temperature sensor is performed. In other cases, the mounting then may be further moved or scanned underneath the non-contact temperature measurement device to obtain temperature readings at different positions within a field of view of the device. This may be repeated at different heating levels, e.g. at increasing energy levels of the radiation source so as to compare sets of temperatures at different temperature levels.

In certain cases, the blocks shown in method 200 of FIG. 2 may be performed during the manufacture of a three-dimensional object. This can prevent in-build temperature calibration drift as, discussed above. Temperature calibration drift can result in build quality deteriorating over the time of the build.

Figure 3:
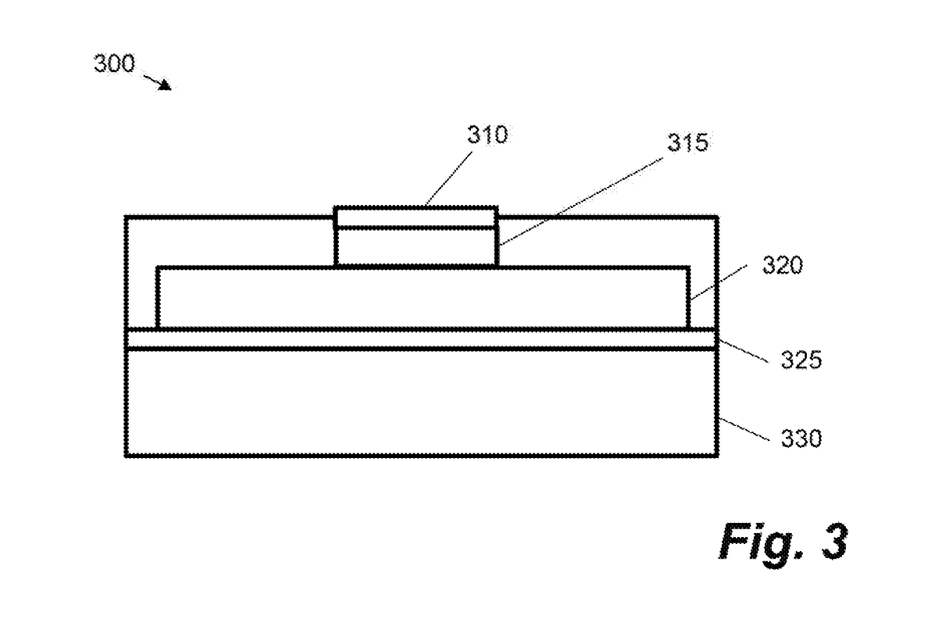
FIG. 3 is a schematic diagram showing a cross-sectional side view of a thermal calibration unit according to an example.

FIG. 3 shows a cross-sectional side view of a thermal calibration unit 300 for receiving energy according to an example. The thermal calibration unit 300 may implement the at least one thermal calibration unit 120 of FIG. 1. The thermal calibration unit 300 comprises a calibration surface 310 which may have a known emissivity. The calibration unit 300 also comprises a temperature sensor 315 in thermal communication with the calibration surface 310. In certain cases, the calibration unit 300 comprises an insulator 320 to thermally insulate the temperature sensor 315 from components of the thermal calibration unit 300 other than the calibration surface 310. The insulator 320 also contributes in reducing the temperature gradients on the calibration surface 310. Also shown in FIG. 3 is a sheet metal holder 325 that supports the insulator 320. The sheet metal holder 325 may support the other components 310, 315, and 320, retaining them in place. The sheet metal holder 325 may form part of, or be attached to, a calibration unit housing 330. In an example the temperature sensor 315 is a PT 1000 body temperature sensor. In one case, the calibration unit housing 330 may be mounted laterally upon an existing print carriage of an additive manufacturing system.

Figure 4:
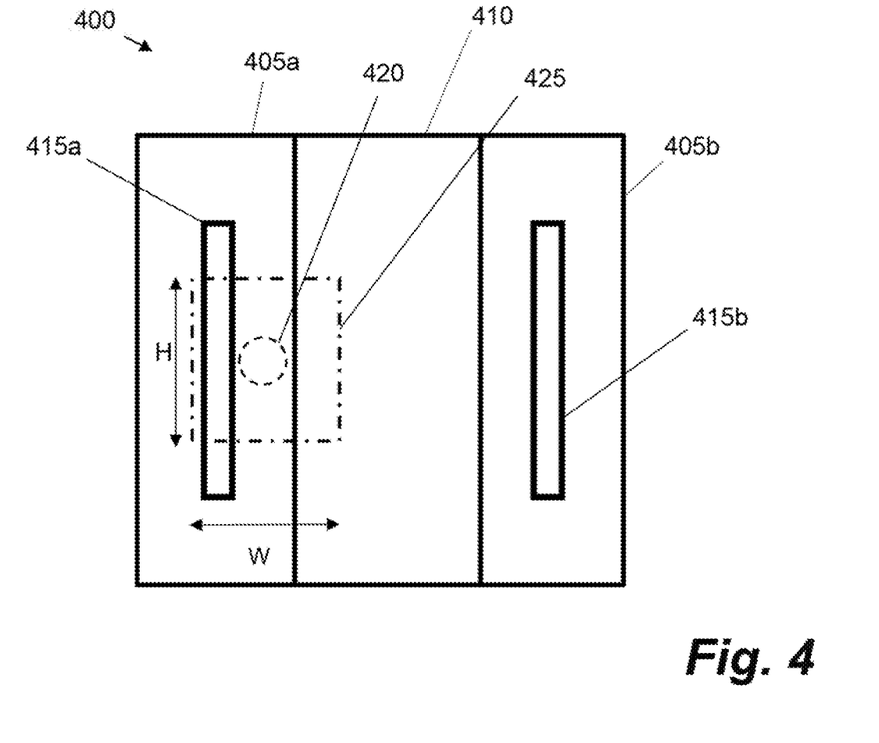
FIG. 4 is a schematic diagram showing build components of an additive manufacturing system according to another example.

FIG. 4 shows build components of an additive manufacturing system 400 according to another example. The additive manufacturing system 400 comprises two thermal calibration units 405a and 405b. In FIG. 4, the two thermal calibration units 405a, 405b are spaced either side of an agent deposit mechanism 410. The agent deposit mechanism 410 may comprise a print carriage for the additive manufacturing system 400. The two thermal calibration units 405a, 405b have respective calibration surfaces 415a, 415b, wherein each surface may have a known emissivity. The two calibration surfaces 415a, 415b may have the same known emissivity. The additive manufacturing system 400 comprises a non-contact temperature measurement device 420 shown in phantom in FIG. 4. A measurement area 425 of the non-contact temperature measurement device 420 is also shown. This measurement area 425 may comprise a field of view for the device 420, e.g. an imaging area for a thermal camera. The calibration surface 415a extends along a height H of a measurement area 425. The length of the calibration surface 415a is therefore enough to cover the whole measurement area 425. In one case, the length of the calibration surface may be equal to the height H. The height H may be equivalent to at least 5 pixels in a heat map obtained from the device 420. In use the agent deposit mechanism 410 moves laterally which in turn moves the thermal calibration unit 405a along a width W of the measurement area 425. At different positions along the width W different measurements of the calibration surface temperature may be made, such that a set of temperature measurements from the calibration surface 415a are recorded that encompass the height H and width W of the measurement area 425. In one case, one temperature measurement is obtained from the calibration surface 415a for each lateral position, e.g. the one measurement is used to calibrate a column of pixels along the height H. Prior to, or during, manufacture one or both of calibration surfaces 415a, 415b may move within measurement area 425. Readings associated with each calibration surface 415a, 415b may be averaged or otherwise combined to increase accuracy computed calibration factors.

In specific examples the calibration surface 415a comprises black anodized aluminum. In a specific example, the calibration surface 415a is formed of a black anodized aluminum surface and body. Other suitable coatings may include polyimide films such as Kapton tape or Teflon tape, as mentioned above, and graphite. In another case, a black commercial coating may be applied in high XY diffusivity graphite body.

The additive manufacturing system 400 shown in FIG. 4 has two calibration surfaces 415a, 415b, however any number of calibration surfaces may be provided. Each surface may have a known emissivity. Each surface has a temperature sensor to provide information on the temperature of the surface. Two or more calibration surfaces provide greater feedback than one surface and as such calibration can occur more regularly and more accurately. Measurements can also be obtained by the non-contact temperature measurement device 420 more often in the system with a plurality of calibration surfaces compared to a system with one. By taking measurements more regularly, there is less time during which the calibration of the non-contact temperature measurement device 420 may drift.

Figure 5:
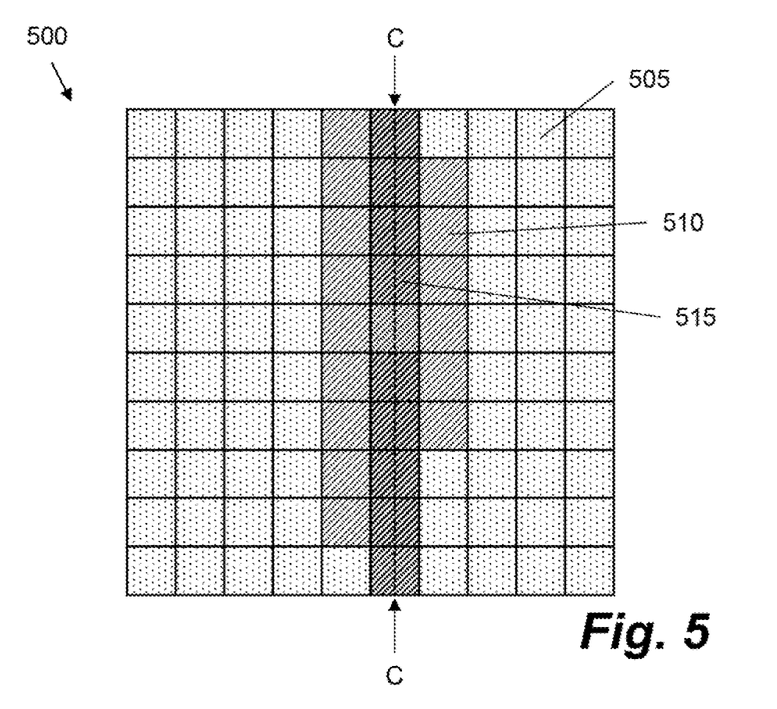
FIG. 5 is a schematic representation of herm measurement data according to an example.

FIG. 5 shows a schematic representation of example temperature measurement data 500, i.e. from a non-contact temperature measurement device, where darker shading indicates areas of the calibration surface of higher temperature. A region 505 has the lowest temperature, a region 510 has a medium temperature, and a region 515 has the highest temperature. The regions of the highest temperature 515 may correspond to a measurement from the calibration surface. In the data 500, each column of pixels may relate to thermal measurements by the non-contact temperature measurement device along the length of a calibration surface such as 415a (e.g. in direction H). Each column may be recorded as a calibration surface is scanned laterally underneath the temperature measurement device. To calibrate the device in this example, an average value of the pixels from the non-contact temperature measurement device data, e.g. in column C that relate to a measurement of the calibration surface, may be compared to a corresponding temperature measurement from the temperature sensor in thermal communication with the calibration surface. Any difference between the two sets of data may be used to adjust or correct the data from the non-contact temperature measurement device.

Figure 6:
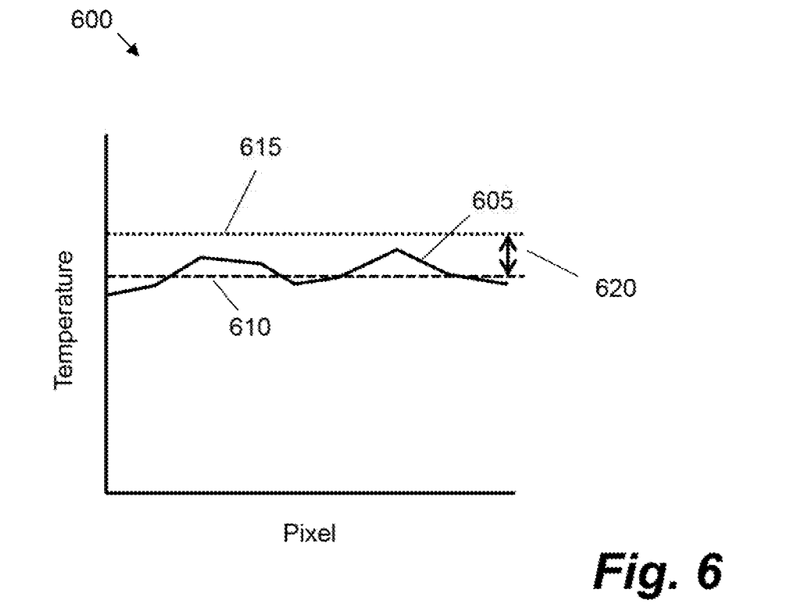
FIG. 6 is a chart showing a comparison of a set of temperatures obtained at different positions according to an example.

FIG. 6 shows a chart showing a comparison of a set of temperatures obtained at different positions according to an example. In this case, the chart 600 illustrates values in pixel column C in FIG. 5. In FIG. 6, line 605 represents pixel values along the pixel column C. In one case, these pixel values are averaged to obtain an average temperature measurement from the non-contact temperature measurement device 115 of FIG. 1 or 420 of FIG. 4. Line 610 shows a calculated average value. This average value is then compared with a temperature reading from the temperature sensor, e.g. 315 of FIG. 3, as shown by line 615. The difference between values 610 and 615, shown as 620 in FIG. 6, may be used to determine a correction profile for the non-contact temperature measurement device 115 of FIG. 1 or 420 of FIG. 4. Charts such as that shown in FIG. 6 may be produced for each column of pixels to determine correction profiles for the whole array, of pixels. Alternatively, the comparison may be made for one column of pixel values and then used to calibrate all other columns of pixel values. Computations may also or alternatively be performed rowwise (e.g. depending on the orientation of the reference element). In this manner a calibration factor or correction profile, which may be pixel-specific, may be obtained for the non-contact temperature measurement device 115 of FIG. 1 or 420 of FIG. 4. In one case, a correction may only, be applied if the difference (e.g. 620) is above a predetermined threshold, i.e. is large enough to merit a correction.

Figure 7:
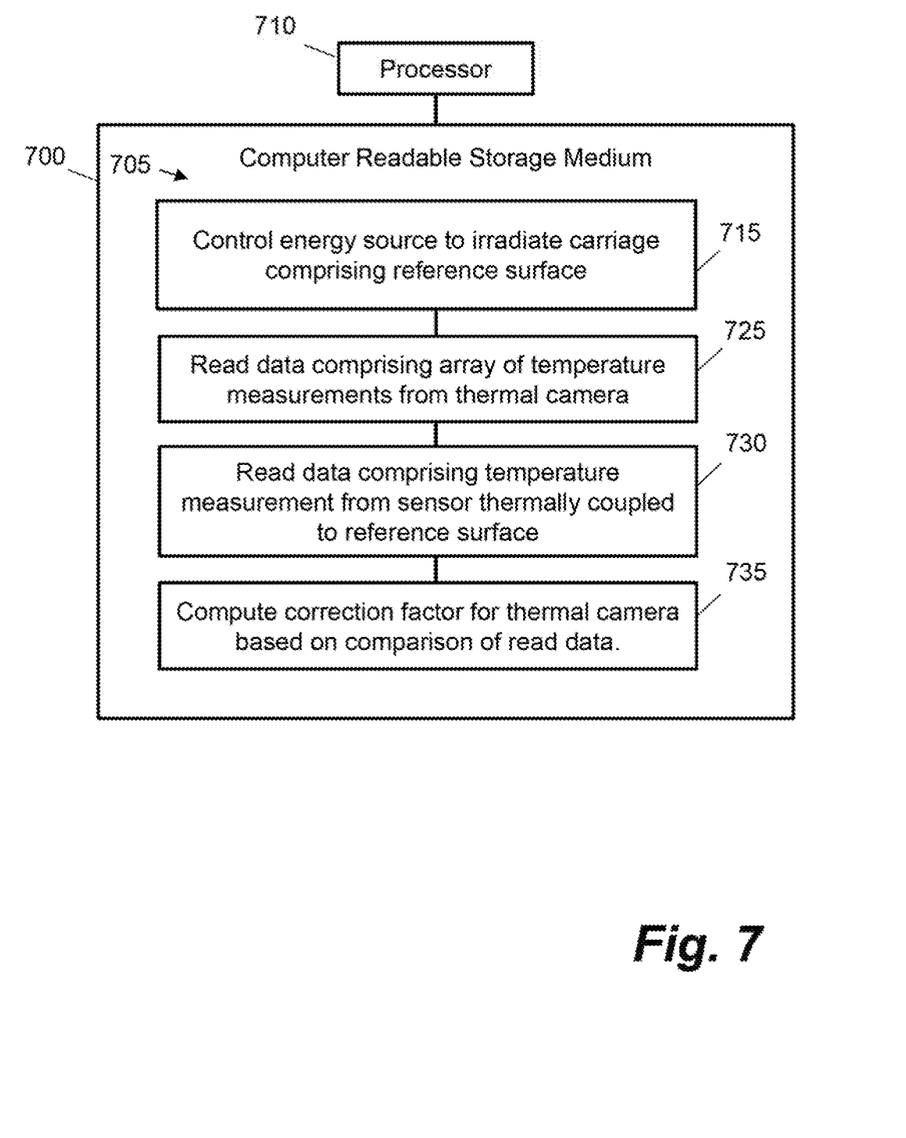
FIG. 7 is a schematic diagram showing an example set of computer-readable instructions within a non-transitory computer-readable storage medium.

FIG. 7 shows an example of a non-transitory computer-readable storage medium 700 comprising a set of computer readable instructions 705 which, when executed by at least one processor 710, cause the processor 710 to perform a method according to examples described herein. For example, the processor 710 may form part of controller 140 in FIG. 1. The computer readable instructions 705 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 705 cause the processor 710 to, at block 715, control an energy source to irradiate a carriage of an additive manufacturing system comprising at least one reference surface which may have known emissivity characteristics.

At block 725, the instructions 705 cause the processor 710 to read data comprising at least one array of temperature measurements from the thermal camera. The at, least one array of temperature measurements may be a row or a column of a two-dimensional heat map obtained by the thermal camera, as described above.

At block 730, the instructions 705 cause the processor 710 to read data comprising at least one temperature measurement from at least one sensor thermally coupled to the at least one reference surface. The temperature measurements from at least one sensor may be obtained from different positions on the reference surface, as described above.

At block 735, the instructions 705 cause the processor 710 to compute a correction factor for the thermal camera based on a comparison of the read data. The correction factor may be obtained for each pixel of the thermal camera to enable a highly accurate thermal measurement calibration, as described above.

Hence, by following the instructions 705, prior to operation of the additive manufacturing system, a print carriage moves under a radiation source. The radiation source heats a set of reference surfaces arranged on the print carriage. The print carriage then scans the reference surfaces under the thermal camera and temperature data are obtained. A controller then corrects the sensor settings. During operation of the additive manufacturing system the reference surfaces may be maintained at a steady working temperature. During operation, the temperature of the reference surfaces ray be read and compared to readings from the thermal camera. In this manner continuous temperature measurement calibration may be achieved.

In one example, instructions 705 may cause the processor 710 to instruct movement of the carriage relative to a thermal camera such that the at least one reference surface is moved within a field of view of the thermal camera. For example, the carriage may be moved while keeping the thermal camera stationary, such that the reference surface comes into the field of view of the thermal camera, as described above.

The preceding description has been presented to illustrate and describe examples of the principles described. This description is not intended to be exhaustive or to limit these principles to any precise form disclosed. Many modifications and variations, are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of calibrating a non-contact temperature measurement device in an additive manufacturing system, the method comprising:

applying energy from a radiation source of the additive manufacturing system to heat a reference element thermally coupled to a temperature sensor; and comparing a temperature reading from the temperature sensor with data from the non-contact temperature measurement device to calibrate said device.

2. The method of claim 1, wherein the reference element has a length extending in a direction perpendicular to a direction of relative moment, the non-contact temperature measurement device comprises a thermal camera, the method comprising:

aligning the length of the reference element with one dimension of a field of view of the thermal camera, and wherein comparing a temperature reading with data from the non-contact temperature measurement device comprises:

obtaining a two-dimensional heat map from the thermal camera, the two-dimensional heat map covering the field of view of the thermal camera;

obtaining a temperature measurement from the temperature sensor at each of a plurality of positions during the relative movement; and, comparing the temperature reading to the two dimensional heat map and using any difference in values therein to calibrate the thermal camera.

3. The method of claim 1, wherein the non-contact temperature measurement device comprises a thermal camera and comparing a temperature reading with data comprises:

obtaining a two-dimensional heat map from the thermal camera;

obtaining a temperature measurement from the temperature sensor; and, comparing an average value of the pixels within the two dimensional heat map with a temperature measurement so as to provide a calibration factor for the thermal camera.

4. The method of claim 1, wherein the method is performed at one or more of the following times: prior to manufacture of a three-dimensional object; and during manufacture of a three-dimensional object.

5. The method of claim 1, wherein the reference element has a known emissivity.

6. The method of claim 1, comprising:

moving the reference element relative to the non-contact temperature measurement device; and comparing a temperature reading from the temperature sensor with data from a different portion of the non-contact temperature measurement device to calibrate said different portion of the device.

7. The method of claim 6, wherein:

the reference element comprises a calibration surface on a print carriage, the print carriage comprising a printhead to deposit printing agents during manufacture of a three-dimensional object;

the non-contact temperature measurement device comprises a thermal camera that is statically mounted above the print carriage; and, wherein moving the calibration surface relative to the non-contact temperature measurement device comprises moving the print carriage within a field of view of the non-contact temperature measurement device.

8. An additive manufacturing system comprising:

a radiation source to apply energy to heat a working area during construction of an object;

a non-contact temperature measurement device to provide a temperature profile of the working area;
a reference element and a temperature sensor thermally coupled to the reference element; and,
a controller to calibrate the temperature measurement device based on a comparison of the temperature profile and temperature readings from the temperature sensor.

9. The system of claim 8, wherein the reference element comprises black anodized aluminum.

10. The system of claim 8, comprising a mounting to effect relative movement between the temperature measurement device and the reference element.

11. The system of claim 10, wherein:
the reference element comprises a calibration surface that extends along a height of a measurement area of the non-contact temperature measurement device; and
the mounting effects movement of the calibration surface along a width of the measurement area.

12. The system of claim 10, wherein the mounting forms part of an agent deposit mechanism to deposit printing agents upon build material arranged within the working area.

13. The system of claim 12, comprising:
two reference elements spaced on either side of the agent deposit mechanism,
wherein the controller is configured to determine a correction profile for the temperature measurement device based on temperature readings from two respective temperature sensors during said relative movement.

14. A non-transitory computer-readable storage medium comprising a set of computer-readable instructions stored thereon which, when executed by a processor of an additive manufacturing system, cause the processor to:
control an energy source to irradiate a reference element on a carriage of the additive manufacturing system;
read data comprising an array of temperature measurements from a thermal camera;
read data comprising a temperature measurement from a sensor thermally coupled to the reference element; and
calibrate the thermal camera based on a comparison of the read data from the thermal camera with the read data from the sensor.

* * * * *